Patented Aug. 19, 1941

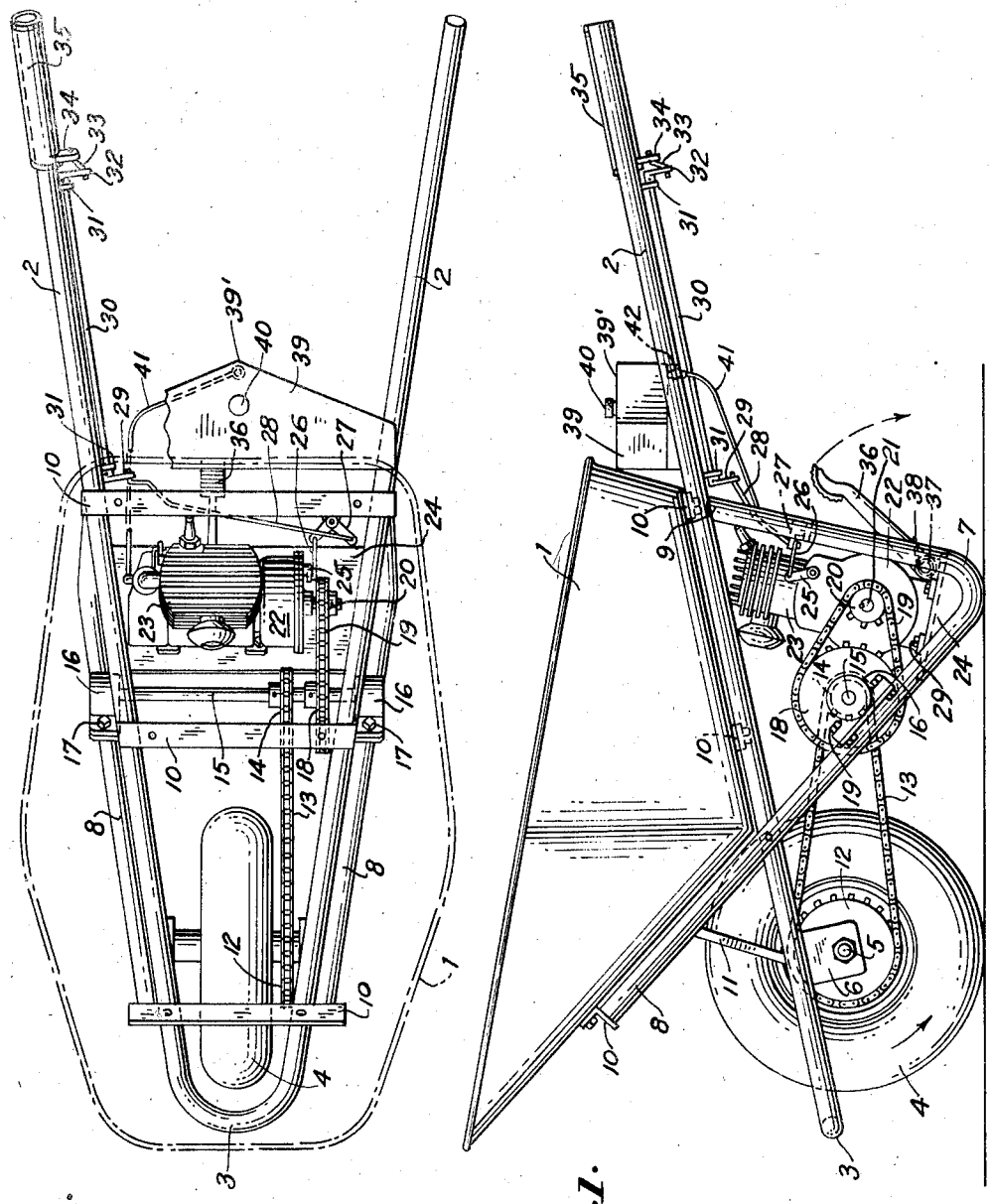

2,253,288

UNITED STATES PATENT OFFICE 2,253,288

WHEELBARROW

Albert P. De Lucchi, San Francisco, Calif.

Application December 17, 1940, Serial No. 370,468

3 Claims. (Cl. 180—19)

This invention relates to wheelbarrows and particularly to wheelbarrows with a body adapted for carrying wet concrete for placement thereof. The principal object of the invention is to provide power driving means for a wheelbarrow which is under the control of the workman guiding the wheelbarrow by the usual handles. A more specific object is the provision of means under the control of the person guiding the wheelbarrow, and while the same is being guided, for connecting and disconnecting the power application to the wheel of the wheelbarrow. A further object of the invention is to provide such a power driven wheelbarrow in which the driving unit is an internal combustion engine mounted below the body of the wheelbarrow so as to be protected as much as possible thereby. A further object is to provide such an engine driven wheelbarrow which may be conveniently started by the workman guiding the wheelbarrow from the usual position holding its handles. A still further object is to provide such an engine driven wheelbarrow in which the fuel supply will not be caused to spill out of its container upon dumping the wheelbarrow either forwardly or to either side or build up excessive head. Further objects and advantages of the invention will appear in the following description and the accompanying drawing.

In the drawing—

Fig. 1 is a side elevation of a wheelbarrow embodying my invention.

Fig. 2 is a plan view of Fig. 1 with the body removed and its position indicated by dotted lines.

In further details the wheelbarrow may be said to be a conventional one of the general form used for the transportation of wet concrete in the placing thereof into forms, etc., though it should be understood that the invention is not restricted to such a particular type of wheelbarrow, but is perhaps more useful on such a type, as a load of wet concrete is excessively heavy and consequently very tiring even to strong men when it is necessary to roll a wheelbarrow full of such mixture up an incline to place in such forms, and which is frequently the case in building construction where elevators are not used.

In the drawing, the main elements of the wheelbarrow comprise an open tub-like body which is indicated at 1, supported on a framework comprising a pair of handles 2, which in this particular case are, as is common, made of pipe joined together by a bend at 3 at the forward end of the wheelbarrow and embracing at that end a ground wheel 4, in this case indicated as a pneumatic tired wheel which is supported on an axle 5 carried by brackets 6 at opposite ends of the axle, welded or otherwise secured to members 2 and the wheel itself is preferably mounted on ball bearings in the usual manner well understood but not shown in the drawing. The frame further comprises a pair of spaced legs 7 preferably also made of pipe or iron and which are bent so as to continue upward under the forward end of the body as at 8 and also upward at the rearward end to join the handle members 2 at 9 where they are preferably welded together. Laterally extending members 10 are also secured to the frame members mentioned and further secured to the body in the common known manner. Also, suitable braces as at 11 may be provided.

The structure so far described is the common and well understood metal wheelbarrow construction as found in general use.

To the above structure I have added a driving sprocket 12 secured to one side of the ground wheel 4 and over which passes an endless drive chain 13 extending around a smaller sprocket 14, carried on a shaft 15 supported at its opposite ends in bearings 16, secured to the frame of the wheelbarrow as by bolts 17, and mounted on which shaft is a large sprocket 18 over which passes a second endless drive chain 19, which at the other end of its loop passes over a small sprocket 20 mounted on the end of an output power shaft 21, extending outward from the reduction gear and clutch housing 22 of an internal combustion engine 23 which is mounted on a bed plate 24 as by bolts 29. The bed plate 24 extends transversely under the body of the wheelbarrow 1 from one leg 7 to the other leg and is preferably welded or otherwise rigidly secured thereto. This engine may be of any standard type, but is here indicated as a single cylinder engine and is provided within the housing 22 with conventional reduction gearing and a clutch which is normally spring disengaged, the operating lever of the clutch projecting from the housing at 25. As the design of the reduction gearing and clutch may vary considerably and is well known in the art, no detail of them is included in the illustration.

In the present showing, the operating clutch lever 25 is connected to a link 26, thence to a bell crank 27 and to a rod 28, thence to another crank 29 secured to the lower end of a revolvable rod 30 extending along one of the handle members 2 and supported thereagainst in bearings 31, and on the upper end of which rod is another crank 32 connected by a link 33 to a laterally projecting lug 34 from a tubular hand grip 35, revolvably mounted upon the outer end of one of the handle members 2, as shown in the drawing, and whereby upon revolving this grip member 35 to the right or to the left the clutch of the engine may be engaged or disengaged to connect the engine 23 to its power output shaft 21 for driving the front wheel 4 of the wheelbarrow through the general reduction drive above described. But owing to the clutch of the engine being normally spring disengaged, the arrangement provides for instant de-clutching of the power drive when handle 35 is released in setting the wheelbarrow down. When the wheelbarrow is set down, the power drive will therefore automatically be disconnected. But when the barrow is picked up again the power drive will not automatically be re-engaged, as it will only be engaged upon turning the hand grip 35 in the proper direction. This arrangement also provides for the disconnecting of the power drive at any time when it is desired to do so, such times for instance as when the workman guiding the heavy barrow full of concrete desires to turn around a sharp corner and the normal speed of the engine would be too great, for safe manipulation of the barrow, as when on a scaffolding, say, but may be as quickly connected again as soon as the curve has been negotiated.

The engine is provided with a foot starting lever 36 which projects rearwardly from the engine to the right of its longitudinal center line, to be available to the right foot of the workman, and this motor starting lever or pedal is normally held in upward position as shown in Fig. 1 by a suitable spring, and which may be coiled around its pivotal mounting 37 as indicated at 38 in dotted lines, or otherwise.

The gasoline or other explosive liquid fuel for the engine is carried in an elevated tank 39 supported across the handle members 2 directly adjacent the rear end of the body 1, and which tank has a filling cap 40 at the rear portion of its upper surface, and an engine delivery tube 41 taking off from a point below the filling cap. This delivery tube is preferably provided with a stopcock 42 for safety purposes. It should be noted that the gasoline tank 39 is of relatively great length in extending across the handles and is somewhat triangular in form in extending rearwardly as shown at 39' and at which point the delivery tube to the engine takes off. In use the tank is supposed to be not over half filled with gasoline, and the particular form of the tank, its length and greater breadth in the center, is for the purpose of providing room at each end for taking the entire contents of the tank when the wheelbarrow is tipped to the right or to the left to dump its load at either side of the body, and at such times the gasoline will flow entirely to one side and cut off the supply to the engine, or when the barrow is tipped forwardly to dump its load out of the forward edge of the body, the gasoline will all flow forwardly and again cut off the supply to the tube 41. This provision prevents any excess head building up in the gasoline pressure to cause trouble with the carburetor, yet there is sufficient gasoline in the delivery tube to keep the engine running for a few moments until the wheelbarrow is again righted.

An important feature is the use of an engine with a speed governor of any desired type. In the present instance the speed governor is assumed to be built in the housing of the engine and is not shown in detail as such a speed governor in its construction forms no part of the invention of applicant, but is an important element in the assemblage, as it is desired to maintain a constant speed of the engine so that the wheelbarrow will have a slow but constant forward motion, and when an incline is reached where the work builds up, the governor will automatically feed more fuel to the engine to prevent it from slowing down, and thus maintain the steady walking speed of the workman.

Also it should be noted that no battery is shown in connection with the engine, as it is equipped with magneto ignition within its housing in the common known manner, though it is of course evident that a battery and generator could be used for ignition if desired, although this would unnecessarily complicate the construction.

With a wheelbarrow constructed in accordance with the foregoing description, the engine may be left continuously running during the use of the wheelbarrow, and it will of course only be operatively engaged to drive the front wheel when the revolvable grip 35 is turned in the right direction, and will as stated always be disconnected automatically when the grip is released. No means is provided for reversing the drive, for one of these wheelbarrows actually constructed in accordance with the drawing has been found extremely serviceable in lessening the work and in greatly reducing the time required in the manual placing of concrete in ordinary building construction, and no occasion for any reverse drive has as yet been found necessary, but on the contrary the apparatus has proved of such great benefit in building construction that its general use without further change except in minor details seems assured.

It should be noted that while I show my invention applied to a wheelbarrow of the one wheel type, some wheelbarrows are made with two wheels in front instead of one wheel, and as the invention is equally applicable to such two wheel wheelbarrows, my appended claims are intended to embrace the improvements set out whether applied to a one wheel or two wheel barrow.

Having thus described my invention, what I claim is:

1. In a wheelbarrow having a load carrying body supported by a frame having a pair of handles at one end and a ground wheel at the other end, the improvement which comprises providing an internal combustion engine with clutch mounted on said frame under the body of the wheelbarrow and having a power delivery shaft, a power reduction drive connecting said shaft with said ground wheel for driving the wheel, a hand grip movably mounted on one of said handles, and motion transmission means extending from said hand grip to the clutch for controlling its operative engagement with said ground wheel, said clutch being of the type normally spring disengaged so that upon releasing said hand grip the power drive connection to said ground wheel will be disconnected.

2. In a wheelbarrow having a load carrying body supported by a frame having a pair of handles at one end and a ground wheel at the other end, the improvement which comprises providing an internal combustion engine mounted on said frame under the body of the wheelbarrow and having a power delivery shaft, a power reduction drive connecting said shaft with said ground wheel for driving the wheel, and manually operated means for controlling the operative connection of the engine to said ground wheel accessible to a workman holding the wheelbarrow by said handles, and a spring retracted foot starting lever for said engine projecting rearwardly of said frame within reach of the foot of a workman positioned between the handles of said wheelbarrow.

3. In a wheelbarrow having a load carrying body supported by a frame having a pair of handles at one end and a ground wheel at the other end, the improvement which comprises providing an internal combustion engine mounted on said frame under the body of the wheelbarrow and having a power delivery shaft, a power drive connecting said shaft with said ground wheel for driving the wheel, manually operated means for controlling the operative connection of the engine to said ground wheel accessible to a workman holding the wheelbarrow by said handles, and a liquid fuel tank for said engine supported across the rear end of the wheelbarrow below the upper edge of said body and provided with a fuel delivery outlet to the engine at a rear central point on said tank, said tank being of a size, length and breadth so that as the barrow is tipped to dump its load forwardly or from either side the liquid fuel in the tank will flow away from said fuel delivery outlet to thereby cut off the supply to the engine during such dumping of the barrow.

ALBERT P. DE LUCCHI.